UNITED STATES PATENT OFFICE.

GEORGE JAMES RANDALL, OF MARBRIER, LONGLEY ROAD, COUNTY OF SURREY, ENGLAND.

PROCESS OF PREPARING AND HARDENING LIMESTONES.

SPECIFICATION forming part of Letters Patent No. 410,607, dated September 10, 1889.

Application filed April 22, 1889. Serial No. 308,151. (No specimens.)

*To all whom it may concern:*

Be it known that I, GEORGE JAMES RANDALL, stone and marble mason, a subject of the Queen of Great Britain, residing at Marbrier, Longley Road, Tooting Graveney, in the county of Surrey, England, have invented a certain new and useful Improved Process for Hardening, Preserving, and Preparing Oolitic and other Limestones; and I do hereby declare that the following is a full, clear, and exact description of the invention, which will enable others skilled in the art to which it appertains to make and use the same.

This invention relates to an improved process for hardening, preserving, and preparing oolitic and other limestones, whereby a hardened face is produced upon the softest limestones, and particularly upon oolitic limestones, rendering them impervious to atmospheric influences and enabling them to take and retain enamel. The process is a very economical one, and limestones treated according to this process possess all the durability of and are much more economical than slate or marble.

According to this invention, I prepare a compound of milk of lime, acetic acid, and cane-sugar in about the following proportions: Milk of lime, one gallon; ordinary cane-sugar, one pound; acetic acid, one-twentieth part of the volume of the milk of lime and cane-sugar.

The milk of lime—which I prefer to use when treating ordinary limestones—I make by adding one pound and a half of lime to a gallon of water. I add rather more water when treating fine stones. The lime is placed in a vat or pan and the water added. When brought into a state of fusion, I add the cane-sugar and stir until the ingredients have become perfectly fused and thoroughly incorporated with each other. I then add the acetic acid and allow the whole to settle.

Molasses may be substituted for the cane-sugar in the compound when the proportions are about as follows: Milk of lime, one gallon; molasses, according to its consistency; acetic acid, one-twentieth part of the volume of the milk of lime and molasses.

The limestone to be treated is first subjected to a temperature sufficient to destroy all vegetable germs, to drive off all quarry-damp and to render the stone more absorbent. After having removed all loose particles from the surface the stone is immersed in a bath of the compound of milk of lime, acetic acid, and cane-sugar or molasses for a time varying according to the size and density of the stone and the depth of saturation required; or the compound may be put on with a brush, if only a thin coat or face is required. The stone is then taken out, and after being rubbed to a face with fine grit is allowed to dry in the atmosphere, after which it is subjected to a diffused (not a direct) dry heat of from 130° to 160° Fahrenheit, such as the diffused dry heat of a hot-air oven. The stone is now ready for ordinary use; but for enameling I prefer to rub the face while the stone is hot with cotton waste moistened with linseed or mineral oil, preferably kerosene; or I rub the face of the stone with cotton waste moistened with any other vegetable oils.

The action of this process is as follows: The acetic acid in the compound remains in solution inactive until brought into contact with carbonate of lime or limestones, when it instantly decomposes the face, generating carbonic-acid gas, and by the time the acetic acid has spent itself sufficient of the carbonic acid so evolved has been absorbed by the compound, (any excess having been driven off.) To perfect the process, the requisite heat must be applied, thus providing the stone with a face which is proof against ordinary atmospheric influences and is impervious to moisture.

When the stone to be treated is fixed in position, as on a building, then the compound may be applied with a brush, either with or without the application of heat.

The action throughout is a chemical one, and that part of the limestone which has become impregnated with the compound forms after treatment material of a different nature, which is similar in its character to marble.

What I claim is—

1. The process herein described for hardening, preserving, and preparing oolitic and other limestones, consisting in subjecting the stone to a temperature sufficient for the purposes hereinbefore set forth, immersing said stone in a bath of the compound of lime, acetic acid, and saccharine matter, then removing said stone thus treated and rubbing to a face with a fine grit, and then drying the same, substantially as set forth.

2. The process herein described for hardening, preserving, and preparing oolitic and other limestones, consisting in subjecting the stone to a temperature sufficient for the purposes hereinbefore set forth, immersing said stone in a bath of the compound of lime, acetic acid, and cane-sugar, then removing said stone thus treated, and rubbing to a face with a fine grit, and then drying the same, substantially as set forth.

GEORGE JAMES RANDALL.

Witnesses:
  B. E. KNIGHT,
54 *Fleet Street, London.*
  WALTER J. SKERTEN,
17 *Gracechurch Street, London, E. C.*